US009674032B2

(12) United States Patent
Edmiston et al.

(10) Patent No.: US 9,674,032 B2
(45) Date of Patent: Jun. 6, 2017

(54) REAL-TIME DISTRIBUTED NETWORK MODULE, REAL-TIME DISTRIBUTED NETWORK AND METHOD THEREFOR

(75) Inventors: Graham Edmiston, Bridge of Weir (GB); Hezi Rahamim, Ramat Gan (IL)

(73) Assignee: NXP USA, INC., Austin, TX (US)

( * ) Notice: Subject to any disclaimer, the term of this patent is extended or adjusted under 35 U.S.C. 154(b) by 50 days.

(21) Appl. No.: 14/348,254

(22) PCT Filed: Nov. 4, 2011

(86) PCT No.: PCT/IB2011/054925
§ 371 (c)(1),
(2), (4) Date: Mar. 28, 2014

(87) PCT Pub. No.: WO2013/064866
PCT Pub. Date: May 10, 2013

(65) Prior Publication Data
US 2014/0233372 A1    Aug. 21, 2014

(51) Int. Cl.
*H04L 12/24* (2006.01)
*H04L 12/40* (2006.01)
(Continued)

(52) U.S. Cl.
CPC .... *H04L 41/0668* (2013.01); *H04L 12/40019* (2013.01); *H04L 12/4035* (2013.01); *H04L 12/40189* (2013.01); *H04L 12/437* (2013.01)

(58) Field of Classification Search
CPC .................................................. H04L 41/0668
See application file for complete search history.

(56) References Cited

U.S. PATENT DOCUMENTS

| 5,146,585 A | * | 9/1992 | Smith, III | G06F 1/14 327/144 |
| 5,434,863 A | * | 7/1995 | Onishi | H04L 12/66 370/402 |

(Continued)

FOREIGN PATENT DOCUMENTS

CN    101145942 A    3/2008

OTHER PUBLICATIONS

International Search Report and Written Opinion correlating to PCT/IB2011/054925 dated Aug. 31, 2012.

(Continued)

*Primary Examiner* — Brian D Nguyen
*Assistant Examiner* — Toan Nguyen

(57) ABSTRACT

A real-time distributed network module arranged to provide an interface between at least one master application and at least one real-time distributed network. The real-time distributed network module comprises a first communications component arranged to transmit and receive real-time distributed network data over at least a first real-time distributed network connection, at least one further communications component arranged to transmit and receive real-time distributed network data over at least one further real-time distributed network connection at least one master application interface component arranged to provide an interface to the at least one master application, and at least one configuration component arranged to perform mapping of communication channels between the first communications component, the at least one further communications component and the at least one master application interface component. The at least one configuration component is further arranged to perform dynamic remapping of the communication channels between the first communications component, the at least one further communications component and the at least (Continued)

one master application interface, upon detection of a link failure within the real-time distributed network.

20 Claims, 9 Drawing Sheets

(51) Int. Cl.
*H04L 12/403* (2006.01)
*H04L 12/437* (2006.01)

(56) References Cited

U.S. PATENT DOCUMENTS

| | | | |
|---|---|---|---|
| 5,481,738 A * | 1/1996 | Bartow | G06F 13/122 340/3.4 |
| 6,912,196 B1 * | 6/2005 | Mahalingaiah | H04L 12/437 370/216 |
| 7,245,582 B1 * | 7/2007 | Roberts | H04J 14/0227 370/217 |
| 7,649,912 B2 | 1/2010 | Balasubramanian et al. | |
| 8,290,602 B2 | 10/2012 | Begey et al. | |
| 8,473,656 B2 | 6/2013 | Kuschke | |
| 2002/0118636 A1 | 8/2002 | Phelps et al. | |
| 2005/0226231 A1 * | 10/2005 | Skerlj | G06F 1/10 370/354 |
| 2007/0217331 A1 | 9/2007 | Khanna et al. | |
| 2011/0026407 A1 | 2/2011 | Tamada et al. | |
| 2011/0029687 A1 * | 2/2011 | Kirrmann | H04L 12/437 709/236 |
| 2011/0205886 A1 | 8/2011 | Maruyama et al. | |

OTHER PUBLICATIONS

Prytz et all.; "Redundant and Synchronized Ether CAT Network"; SIES 2012; 2010; pp. 201-204; IEEE.

* cited by examiner

REAL-TIME DISTRIBUTED NETWORK MODULE, REAL-TIME DISTRIBUTED NETWORK AND METHOD THEREFOR

FIELD OF THE INVENTION

The field of this invention relates to a real-time distributed network module, a real-time distributed network and a method of configuring at least part of a real-time distributed network.

BACKGROUND OF THE INVENTION

In the field of automated systems, for example automated industrial systems such as manufacturing assembly lines or automotive control systems, a real-time distributed control system is often required in order for the systems to function effectively. In order to enable such real-time distributed control, a fieldbus is typically implemented to provide a real-time distributed communication mechanism between the various components that require the real-time distributed control. Fieldbus is the name of a family of industrial computer network protocols used for real-time distributed control, now standardized as IEC 61158. EtherCAT (Ethernet for Control Automation Technology) is an example of such a fieldbus network, and in particular comprises an Ethernet-based fieldbus network.

An important aspect of such fieldbus networks is their ability to provide real-time distributed control. In order to enable such real-time control, fieldbus networks such as EtherCAT networks rely on the synchronisation of the individual nodes within the system using a distributed clock mechanism, which enables the various slave nodes within the network to be synchronised within a common fieldbus time domain, and thus enables the fieldbus devices and their local applications to be synchronised to each other.

EtherCAT uses hardware within the slave nodes to synchronize the slaves to the master's time domain. Additionally, an EtherCAT 'slave' controller provides an interface between the EtherCAT fieldbus and a slave application. The master device is responsible for distributing frames with specific commands that slaves use to synchronize their clocks. The master device is not required to implement an EtherCAT specific hardware, and often such master devices comprise standard Ethernet controllers. As such, the master device is often located outside of the synchronised time domain of the EtherCAT system and may require specific algorithms to synchronize its time domain to the EtherCAT network.

The distributed clock system typically implemented within an EtherCAT system can synchronise all EtherCAT nodes to one reference clock. Typically, the first slave node with distributed clock capability after the master device, within a particular Ethernet network segment, is used to provide a reference time (system time) to which all other nodes within the system are synchronised. This system time is used as the reference clock in order to synchronise the local clocks of the other EtherCAT devices, and that of the master device. Propagation delays, local clock source drift and local clock offsets are taken into account for such clock synchronisation.

The clock synchronisation process typically consists of three stages:
1. Propagation delay measurement, where the master device initiates propagation delay measurement between all slave nodes in all directions by transmitting an ARMW (Auto increment physical Read Multiple Write) broadcast message. Each EtherCAT slave controller measures and saves locally the receive time of the measurement frame in each direction. The master device collects the receive times once the ARMW frame has travelled around the EtherCAT network and returned, and calculates the propagation delays between the slave nodes;
2. Offset compensation to reference clock (system time), where the local time of each slave clock is compared to the system time, and the difference compensated individually by writing to each slave. All devices are compensated to have the same absolute system time.
3. Drift compensation to Reference Clock, where the drift between the reference clock and local clock within each slave node is required to be compensated for by periodically measuring the differences between the two and readjusting the compensation therefor.

Another requirement of many automated systems is availability/reliability of the system. Redundancy is one technique for increasing the reliability of a system, and in particular for increasing the availability of the system following a link failure. A proposed technique for providing redundancy within EtherCAT systems is a ring redundancy approach, such as illustrated in FIG. 1. In this known technique for providing redundancy within an EtherCAT system, an EtherCAT master device 110 is implemented with a master node 112 and two integrated EtherCAT slave nodes 114, 116. The EtherCAT network is arranged into a ring topology, with the EtherCAT master device 110 sending duplicate data packets in each direction around the ring (via each of the integrated slave nodes 114, 116). When a break occurs in the network, such as illustrated at 120, two independent EtherCAT line networks 140, 145 are created with each line network 140, 145 receiving a version of the (duplicated) data packets.

EtherCAT slave controllers are arranged to close an open port automatically if no device is detected on that port, and to forward frames on the next available port. Accordingly, upon a link failure 120 within the ring topology, the slave nodes 130, 135 either side of the break 120 close their respective ports and enable this 'loopback' functionality wherein frames will be looped back in the direction from which they came, creating two 'out and back' EtherCAT line networks 140, 145. Advantageously, because the EtherCAT master 110 sends duplicate data packets via each of the integrated slave nodes 114, 116, slave nodes within both of the line networks 140, 145 will continue to receive the data frames.

To minimise latency and jitter, EtherCAT slave nodes are arranged to process traffic only in one direction; all other directions of data flow within each slave node being limited to forwarding of the data. Thus, for a ring topology such as illustrated in FIG. 1, the slave nodes are typically orientated such that they process data travelling in the same direction. Accordingly, following a link failure 120, the direction of processing for the external slave nodes in one of the resulting line networks 140 will be towards the master device 110, whilst the direction of processing for the external slave nodes in the other resulting line network 145 will be away from the master device 110. In order to maintain synchronisation between the line networks, each of the integrated slave nodes 114, 116 is required to provide the distributed clock, and thus required to be the 'first' slave node within the respective line network 140, 145. Accordingly, for this known solution, the processing directions for the integrated slave nodes 114, 116 are structurally opposite to one another within the network ring in order to enable both of the integrated slave nodes 114, 116 to be 'first' in the respective line networks 140, 145 following a line break.

Due to the unidirectional processing performed by the slave nodes, the master device 110 is required to reconfigure the network topology upon link failure in order to take into consideration changes in the relative processing order of the slave nodes, and thus the addressing modes post link failure; in particular in relation to position addressing.

However, a transition from a ring topology to a dual-line topology has a significant impact on the synchronisation of the various nodes within the EtherCAT network. Whilst integrating the two slave nodes 114, 116 within the master device 110 enables a degree of synchronisation to be maintained between the two resulting EtherCAT line networks 140, 145, the master device 110 is required to re-calculate the propagation delays between the slave nodes within the new network topology. As it is not possible to know in advance where a link failure might occur, it is necessary to either re-calculate from scratch the new propagation delays after the link failure 120 occurs, which is time consuming and thus delays recovery from the link failure, or to calculate in advance propagation delay data for all possible scenarios, which not only adds complexity and delay to the initial propagation delay measurement process, but also requires memory space to store the propagation delay data and a more complex algorithm post link failure to redress synchronous behaviour. Since an EtherCAT network can comprise, in some examples, hundreds of slave nodes, it is clearly impractical to calculate and store propagation delay data for all possible scenarios.

In addition, the requirement for the master device 110 to duplicate packets and transmit them in two directions around the ring introduces more processing cycles, complexity and jitter into the transmission of data packets. For example, the master device 110 has to feed two transmit ports. It does this by sending the same packet on the two ports; either by duplicating the packet or handling two transmit queues. When the frames are looped back, the master device 110 also has to handle two receive flows, which increases the overall network complexity especially after a link failure. Specifically, the master device 110 has to know those slaves that are in each of the resulting line network paths 140, 145, and make sure that the processed elements of the frames are cognisant with regards to the current network topology. Accordingly, the master device 110 is required to perform a significant amount of additional checking.

Another limitation of this known approach to providing redundancy within an EtherCAT network is that it is only capable of supporting a ring topology, and thus only allows the deployment of slave nodes comprising two ports. Accordingly, it does not enable redundancy to be provided within more complex network topologies, such as tree topologies or the like.

SUMMARY OF THE INVENTION

The present invention provides a real-time distributed network module, a real-time distributed network, a method of configuring at least part of a real-time distributed network and a non-transitory computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to a fieldbus module arranged to provide an interface between a master application and an EtherCAT network. However, it is contemplated that the present invention is not limited to being solely implemented within EtherCAT systems, and may equally be implemented within alternative real-time distributed networks in which redundancy and synchronisation between network elements are required. In particular it is contemplated that the present invention may be equally implemented within alternative fieldbus networks.

Figure 1:
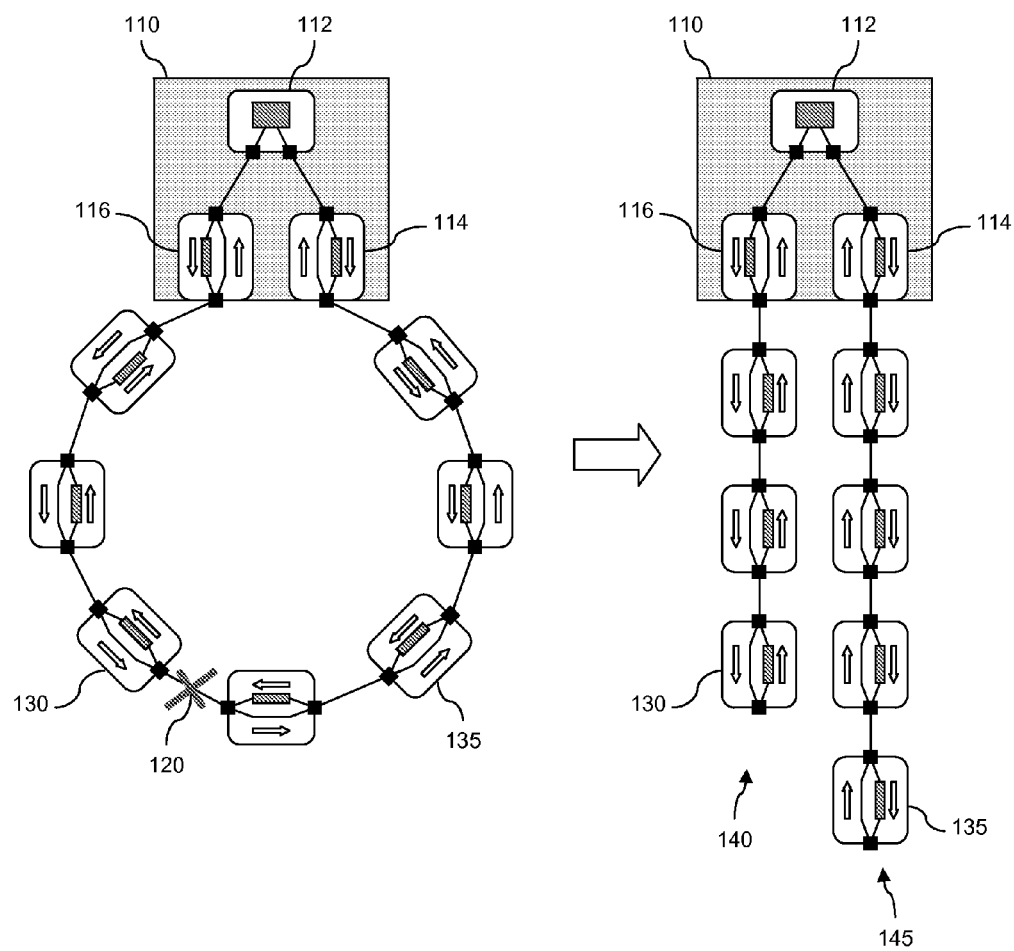
FIG. 1 illustrates a simplified block diagram of a known EtherCAT system.
Figure 2:
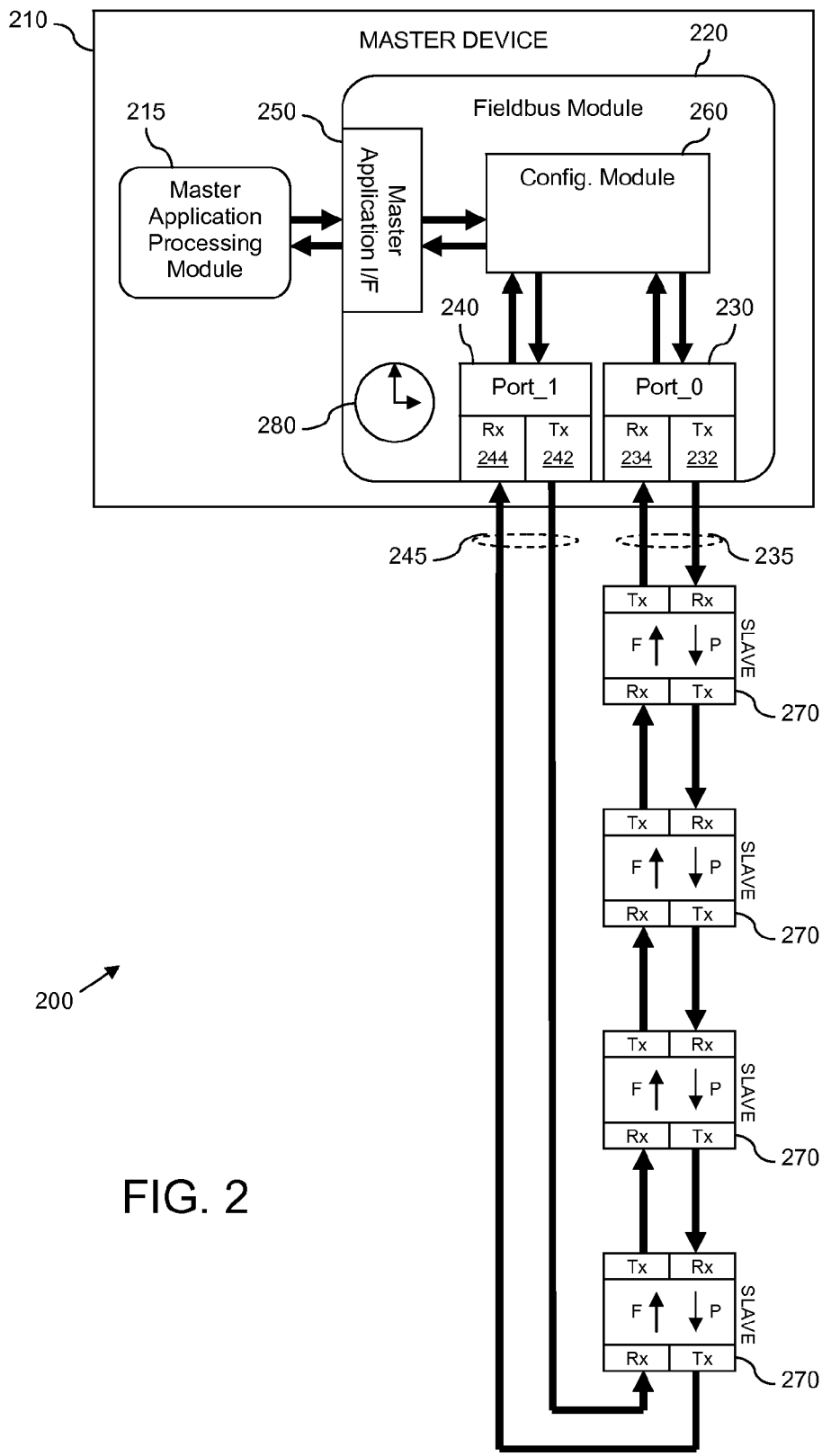
FIGS. 2 to 4 illustrate simplified block diagrams of a first example of a fieldbus network configuration.

Referring first to FIG. 2, there is illustrated a simplified block diagram of an example of a fieldbus network 200, which in the illustrated example comprises an EtherCAT system. The fieldbus network 200 comprises a master device 210. The master device 210 illustrated in FIG. 2 comprises at least one signal processing module 215 arranged to execute one or more master device applications, including software code routines. The master device 210 further comprises at least one fieldbus module 220 arranged to provide an interface between the one or more master applications running on the signal processing module(s) 215 and at least one fieldbus network, such as the fieldbus network 200.

The fieldbus module(s) 220 comprise(s) a first communications component 230, denoted as Port_0 in the illustrated example, arranged to transmit and receive fieldbus data over a fieldbus connection, illustrated generally at 235. The fieldbus module(s) 220 further comprise(s) at least one further communications component, such as the second communications component 240 denoted as Port_1 in the illustrated example, arranged to transmit and receive fieldbus data over at least one further fieldbus connection, such as illustrated generally at 245. In this manner, the first and second communications components 230, 240 may be operably coupled to respective slave nodes 270 within the fieldbus network 200. The fieldbus module(s) 220 further comprise(s) at least one master application interface component 250 arranged to provide an interface to the one or more master applications running on the signal processing module(s) 215. The fieldbus module(s) 220 still further comprise(s) at least one configuration component 260 arranged to perform mapping of communication channels between the communications components 230, 240 and the master application interface component 250.

As shown in FIG. 2, the first and second communications components 230, 240 are connected through the slave nodes 270 in such a manner that data transmitted by the first communications component 230 (more specifically over transmit (TX) channel 232) to the slave nodes flows in a first direction towards the second communications component (more specifically to receive, RX, channel 244 thereof). Data transmitted by the second communications component 240 flows in a second direction, opposite to the first direction, towards the first communications component 230, as indicated with the arrows F and P in FIG. 2.

Figure 3:
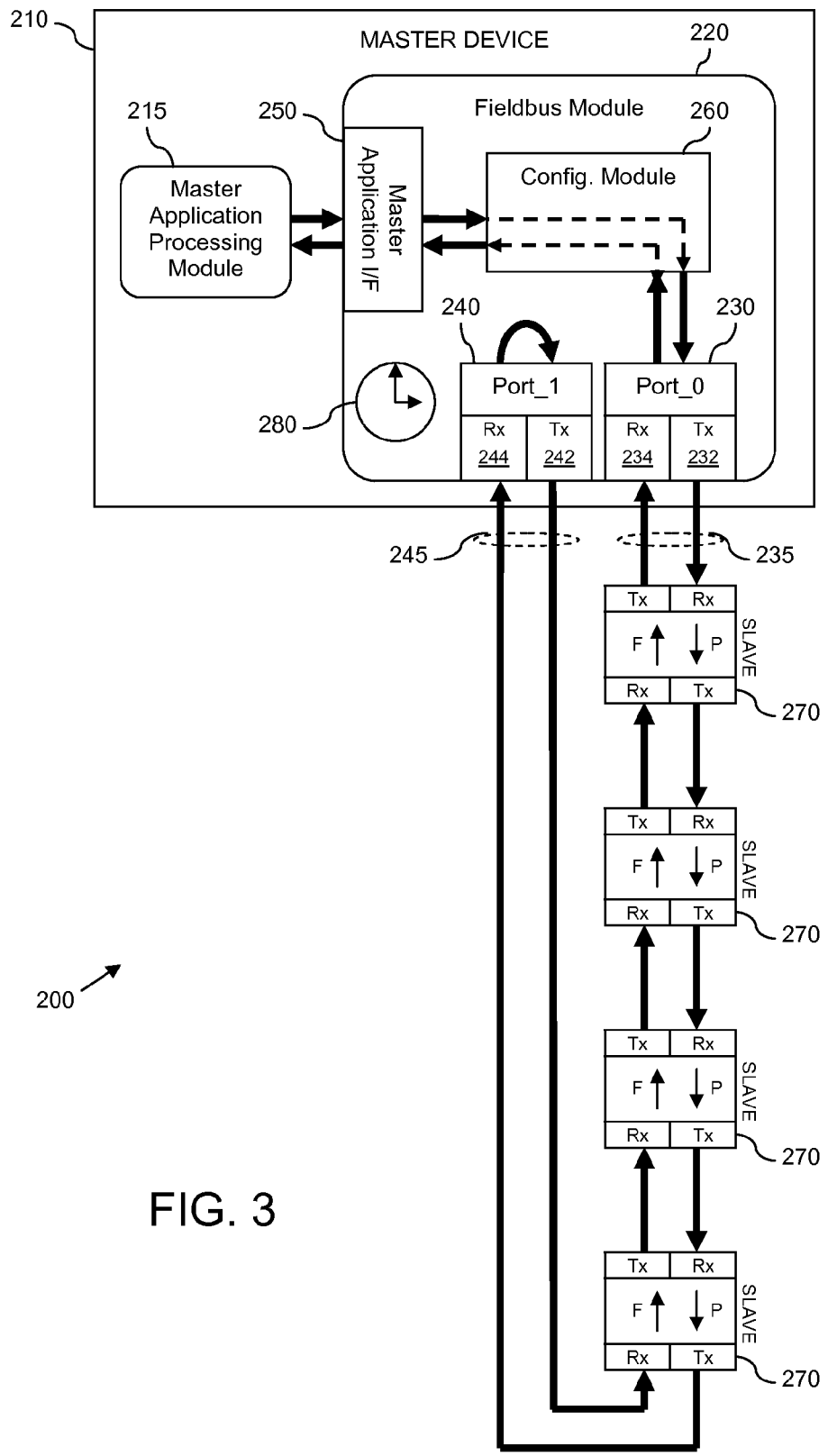

For example, and as illustrated in FIG. 3, the fieldbus module 220 may be configured to operate in a first, redundant mode, wherein the configuration component 260 may be arranged to: configure the first communications component Port_0 230 to comprise an open configuration, wherein a transmit communication channel 232 and a receive communication channel 234 of the first communications component Port_0 230 are mapped to respective communication channels of the master application interface component 250; and configure the second communications component Port_1 240 to comprise a closed configuration wherein a transmit communication channel 242 of the second communications component Port_1 240 is mapped to a receive communication channel 244 of the second communications component Port_1 240. Hence, data received by the second communications component 240 can be transmitted by the second communications component 240 in a direction opposite to the receiving direction, back towards the first communications component 230.

In this manner, and by operably coupling the slave nodes 270 to form a circuit between the two communications components 230, 240 of the fieldbus module(s) 220 as illustrated in FIGS. 2 and 3, a fieldbus network 200 may be created in which the first communications component Port_0 230 of the fieldbus module(s) 220 may form the first node in the fieldbus network 200, and via which the master application(s) running on the signal processing module(s) 215 is/are able to transmit data frames over the fieldbus network. Conversely, the second communications component Port_1 240 of the fieldbus module 220 forms the last node in the network. By configuring the second communications component Port_1 240 of the fieldbus module 220 to comprise a closed configuration, the second communications component Port_1 240 provides a 'loopback' functionality whereby data frames are looped back around the fieldbus network, via the slave nodes 270 to the first communications component Port_0 230.

In particular for the illustrated example, the slave nodes 270 are orientated such that they process data frames in the first or 'outbound' direction, as generally denoted by the letter 'P'; e.g. in a direction away from the first communications component Port_0 230. Accordingly, data frames returning from the second communications component Port_1 240 and flowing in the second or 'inbound' direction are simply forwarded by the slave nodes 270 without any processing being performed, as generally denoted by the letter 'F'.

Figure 4:
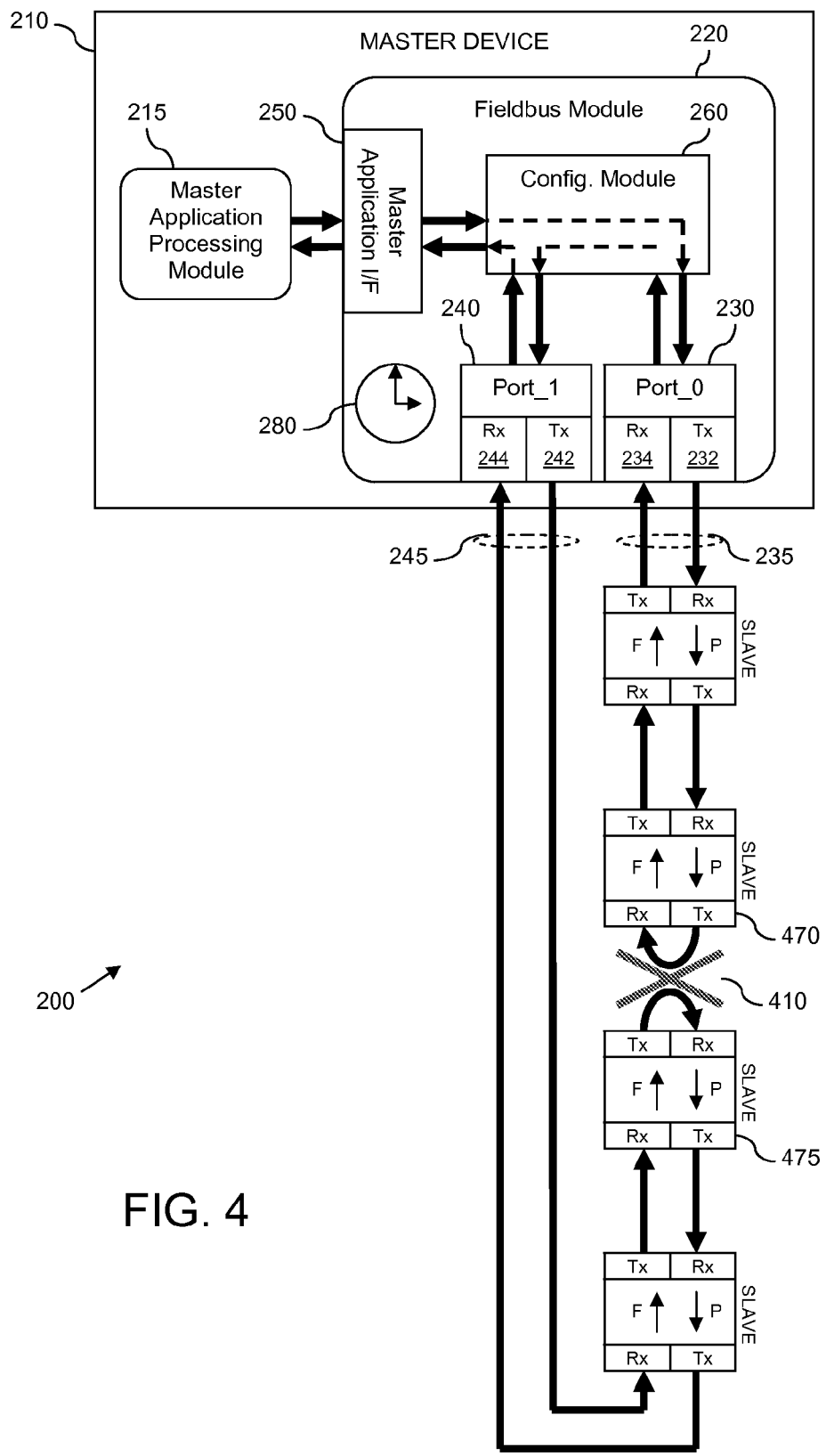

Furthermore, and as illustrated in FIG. 4, the fieldbus module(s) 220 may be configurable to operate in an at least one further, failed link mode, wherein the configuration component 260 may be arranged to, upon detection of a link failure 410 within the fieldbus network 200: remap the receive communication channel 234 of the first communications component Port_0 230 to the transmit communication channel 242 of the second communications component Port_1 240; and remap the receive communication channel 244 of the second communications component Port_1 240 to the respective communication channel of the master application interface component 250. Advantageously, EtherCAT slave nodes are arranged to close an open port automatically if no downstream device is detected, and to forward Ethernet Frames on the next available port, which for a two port slave node will be the port via which the frame was received. Accordingly, in the illustrated example, upon a link failure 410 within the fieldbus network, slave nodes 470, 475 that are located either side of the link failure 410 close their respective ports and enable their 'loopback' functionality, wherein data frames will be looped back in the direction from which they came.

Thus, reconfiguring the fieldbus module(s) 220 to operate in this second, failed link mode in this manner enables data frames that have been looped back by the slave node 470, adjacent the link failure 410 in the outbound direction to the first communications component Port_0 230 to be re-routed from the first communications component Port_0 230, through the fieldbus module 220 to the second communications component Port_1 240, from where they may be sent to the remaining slave nodes 'downstream' (as seen in the outbound direction P) of the link failure 410. As previously mentioned, the slave nodes 270 are orientated such that they process data frames in an 'outbound' direction; e.g. in a direction away from the first communications component Port_0 230. When the re-routed data frames are transmitted by the second communications component Port_1 240 to the slave nodes, the direction of flow of the data frames through the remaining slave nodes is initially in the forwarding direction. Upon reaching the slave node 475 adjacent the link failure 410, the data frames are looped back by the slave node 475. Following being looped back in this manner, the direction of flow of the looped back data frames through the slave nodes is now in the processing direction P. In this manner, the order in which the data frames are processed by the slave nodes 270 when the fieldbus module(s) 220 has/have been configured to operate in this second, failed link mode following a link failure 410 is the same as the order in which the data frames are processed by the slave nodes 270 when the fieldbus module(s) 220 is/are configured to operate in the first redundant mode before a link failure has occurred. Accordingly, the need for the master application(s) running on the signal processing module(s) 215 to adapt its/their behaviour to compensate for changes in the network topology, post link failure is obviated. As such, the time and algorithm complexity required to recover from a link failure may be significantly reduced.

Also, the master application(s) running on the signal processing module(s) 215 is/are able to transmit data frames over the fieldbus network 200 using the same communications component 230, 240, irrespective of whether the fieldbus module 220 is/are configured to operate in the first, redundant mode or the second, failed link mode; e.g. using the first communications component Port_0 230 in the illustrated example. Furthermore, data frames are not required to be duplicated in order to provide redundancy within the fieldbus network 200. Accordingly, additional processing cycles, complexity and jitter need not be introduced into the transmission of data packets, nor is additional checking, etc., required for received data frames.

In the illustrated example, the fieldbus module(s) 220 further comprise(s) a high resolution timing source, illustrated generally at 280. In this manner, the first and second communications components 230, 240 are capable of providing a clock reference for use within a distributed clock synchronisation mechanism.

For example, and referring back to FIG. 3, during normal operation when no link failures are present within the fieldbus network 200, and the fieldbus module(s) 220 is/are configured to operate in the first, redundant mode, the first communications component Port_0 230 of the master device 210 may be considered as the first node within the fieldbus network 200. Accordingly, the first communications component Port_0 230 may be used to provide a reference time (system time) to which all other nodes within the fieldbus network 200 are synchronised. A master application running on the signal processing module(s) 215 may initiate propagation delay measurement by transmitting an ARMW (Auto increment physical Read Multiple Write) broadcast message to all nodes within the fieldbus network 200 (including the communications components 230, 240 integrated within the master device 210). Each node controller measures and writes the receive time of the measurement frame in each direction (e.g. in the processing and forwarding directions). The master application collects the receive times once the ARMW frame has travelled around the network and returned, and calculates the propagation delays between the nodes. Once the master application has determined the delay for each node, the local time of each slave clock is compared to the system time held by the first communications component Port_0 230, and the difference compensated for individually by writing an offset to each slave node 270; all slave nodes 270 being compensated to have substantially the same absolute system time. Thus, all nodes within the fieldbus network 200 are synchronised with the first communications component Port_0 230, and advantageously with the fieldbus module 220 of the master device 210 enabling master and slave application to be synchronised.

Referring back to FIG. 4, when a link failure 410 occurs in the fieldbus network 200, by re-mapping the communication channels as described above, such that the fieldbus component 220 is configured to operate in the at least one further failed link mode, the first communications component Port_0 230 remains the first node within the fieldbus network 200. Accordingly, the first communications component Port_0 230 remains a valid clock reference for all nodes within the network, and thus the slave nodes 270 remain substantially synchronised after a link failure. Furthermore, because the order in which the data frames are processed by the slave nodes 270 remains the same when the fieldbus module(s) 220 is/are configured to operate in the at least one further, failed link mode, the propagation delays between the slave nodes 270 is only affected by the re-routing of the data frames between the slave nodes 470, 475 located either side of the link failure. Accordingly, the master device 210 is only required to recalculate the propagation delay between the slave nodes 470, 475 located either side of the link failure. Due to the relatively minor nature of such a recalculation, it may be performed 'on-the-fly', upon detection of the link failure 410, without causing significant delay in recovering from the link failure 410.

In some examples, the communications components 230, 240 of the fieldbus module(s) 220 is/are capable of performing cut-through forwarding of data frames in order to reduce latency and jitter, and in particular may be selectively configurable to perform cut-through forwarding of data received at a receive communication channel thereof. As such, in the illustrated example the communications components 230, 240 may be arranged to support at least a subset of EtherCAT processing functionality or local proprietary commands contained within metadata or descriptors (not shown) supplied by the master application(s). Such metadata can be of the form of a command descriptor that the configuration component 260 of the fieldbus module(s) 220 interpret(s) and process(es), for example: 'at offset X of the data frame, insert data from offset Y in memory (not shown) of the master device 210/fieldbus module 220/configuration component 260', or configuration information. Furthermore, in some examples, the communications components 230, 240 of the fieldbus module(s) 220 may be selectively configurable to process and/or parse data frames in a transmit direction and/or a receive direction. In this manner, the communication components 230, 240 may be configured to support a plurality of different network topologies and configurations, as well as a plurality of fieldbus modes.

Furthermore, enabling signal processing within receive and transmit threads of the communication components 230, 240 allows flexibility in the mechanism for providing data frames to the communication components 230, 240. For example, the master application interface 250 may comprise, say, a Media Independent Interface (MII). As such, the data frames may be received from and returned to the master application running on the processing module 215 via Ethernet, and thus comprise Ethernet data frames that require little (if any) processing. In such a scenario, the master device 210 would require two additional Ethernet communication ports to implement the master application interface; one on the master application side and one on the fieldbus module side. However, in some examples, by enabling processing within receive and transmit threads of the communication components 230, 240, the fieldbus module(s) 220 may be arranged to read datagrams directly from memory (not shown), with the master application interface 250 comprising, for example, a direct memory access (DMA) module. As such, the communications component 230, 240 receiving the datagrams may be required to process the datagrams before the data may be transmitted over the fieldbus network 200, and to process returned data frames before writing back to memory. In this manner, additional Ethernet communication ports are not required.

As previously mentioned, the configuration component 260 is arranged to perform dynamic re-mapping of the communication channels of the communications components 230, 240 from the first, redundant mode configuration to the at least one further failed link mode configuration, upon detection of a link failure within the fieldbus network 200. In some examples, such a link failure may be detected directly by the fieldbus module(s) 220. For example, when the slave nodes 470, 475 either side of the link failure 410 close their respective ports and enable their 'loopback' functionality, those slave nodes 470, 475 may be configured to set a bit, such as a re-circulate bit, within at least the first data frame that is looped back. The first communications components 230, 240 of the fieldbus module(s) 220 may be arranged to at least parse received data frames in order to detect whether such a bit has been set, and thus to detect when a link failure has occurred within the fieldbus network 200. In this manner, the fieldbus module(s) 220 may be thus arranged to cause the configuration component 260 to perform dynamic re-mapping of the communication channels of the communications components 230, 240 from the first, redundant mode configuration to the at least one further failed link mode configuration, upon receipt of an indication of a link failure within a fieldbus data frame.

Additionally and/or alternatively, such a link failure may be detected by a master application, for example as a result of commands not being processed by slave nodes that reside beyond the link failure. Thus, the fieldbus module(s) 220 may be arranged to receive commands from the master device 210, via the master application interface 250 or within a data frame therefrom, to configure the configuration component 260 to perform dynamic re-mapping of the communication channels of the communications components 230, 240 from the first, redundant mode configuration to the at least one further, failed link mode configuration, upon detection of a link failure within the fieldbus network 200.

Additionally and/or alternatively, such a link failure may be detected by the fieldbus module 220 itself. For example, for the illustrated example configuration hereinbefore described the fieldbus module(s) 220 has/have been configured to operate in a first, redundant mode pre link failure, wherein the configuration component 260 is arranged to configure the first communications component 230 to comprise an open configuration and configure the second communications component 240 to comprise a closed configuration. However, the fieldbus module(s) 220 may be equally configured to operate in a first, redundant mode pre link failure (e.g. having completed propagation delay measurements), wherein the configuration component 260 is arranged to configure both the first and second communications components 230, 240 to comprise open configurations. In such a configuration, the master application(s) running on the signal processing module(s) 215 need only transmit data frames over the fieldbus network 200 via, for example, the first communications components 230; e.g. in the processing direction. In this manner, when a link failure 410 occurs, following the slave nodes 470, 475 either side of the link failure 410 closing their respective ports and enabling their 'loopback' functionality, data packets looped back by the slave node 475 downstream of the link failure will be (re-) received by the second communications component 240 of the fieldbus module 220. Accordingly, the fieldbus module(s) 220 may use such re-receipt of the looped back data frames to detect the link failure.

Figure 5:
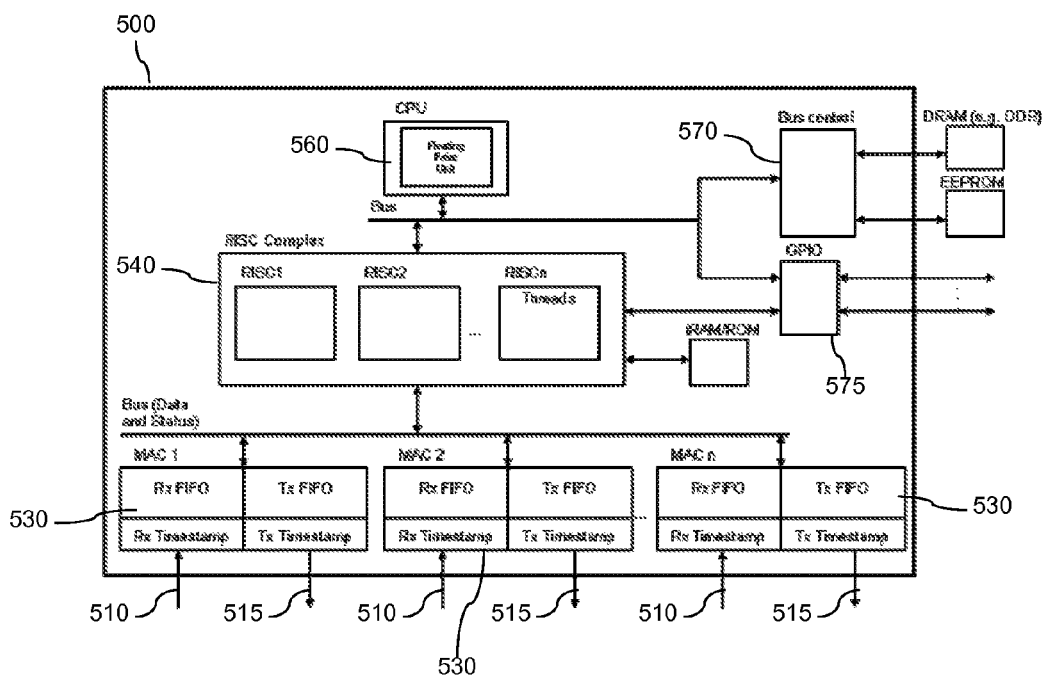
FIG. 5 illustrates a simplified block diagram of an integrated circuit device.

Referring now to FIG. 5 there is illustrated a simplified block diagram of an example of an integrated circuit device 500 arranged to implement a fieldbus module such as the fieldbus module 220 of FIGS. 2 to 4. The integrated circuit device 500 is arranged to receive packets of data, or 'frames', via one or more input channels as illustrated generally at 510, and to route/forward received data frames over one or more output channels, as illustrated generally at 515. The fieldbus module 220 further comprises a plurality of communications components 530 arranged to transmit and receive data frames via the input and output channels 510, 515. The communications components 530 may be implemented by way of Media Access Controllers (MACs), for example Ethernet or EtherCAT MACs containing time-stamping hardware to assist in the synchronisation and/or distributed clock mechanism. The integrated circuit device 500 in the illustrated example further comprises a RISC (Reduced Instruction Set Computing) complex 540 one or more RISC processors configurable to perform processing, etc., of data frames received via the communications components 530. The integrated circuit device 500 further comprises one or more processing units 560 for running application software and managing the data plane hardware; e.g. to start and stop channels or change the routing of data frames, etc. Thus, for the example illustrated in FIGS. 2 to 4, the configuration component 260 may be implemented as computer program code running on such a processing unit 560.

In the example illustrated in FIG. 5, the integrated circuit device 500 further comprises a bus control module 570 and general purpose input/output lines 575, which may be used to enable communication between the integrated circuit device and, say, a processing module on which a master application is running, etc.

Figure 6:
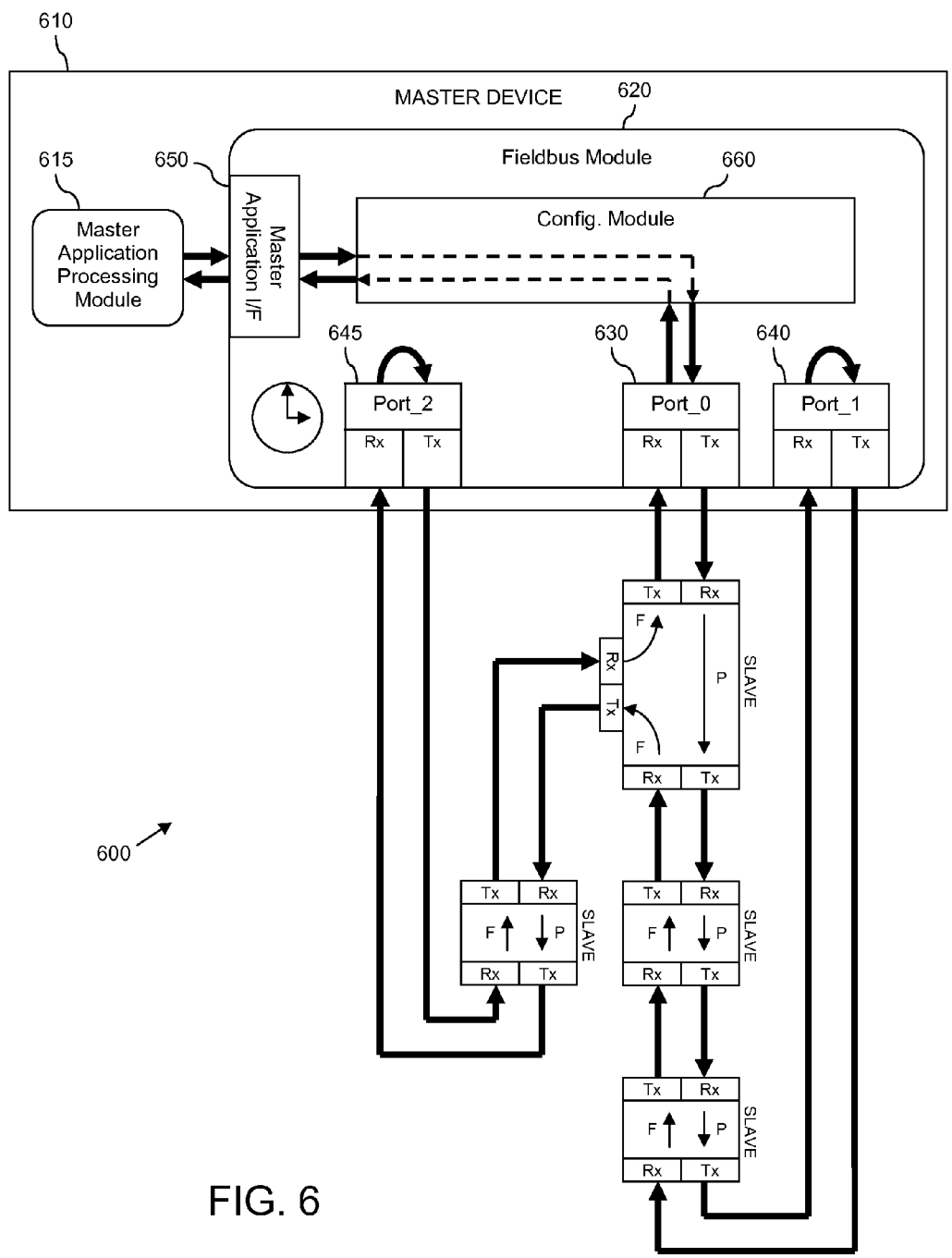
FIGS. 6 to 8 illustrated simplified block diagrams of a further example of a fieldbus network configuration.
Figure 7:
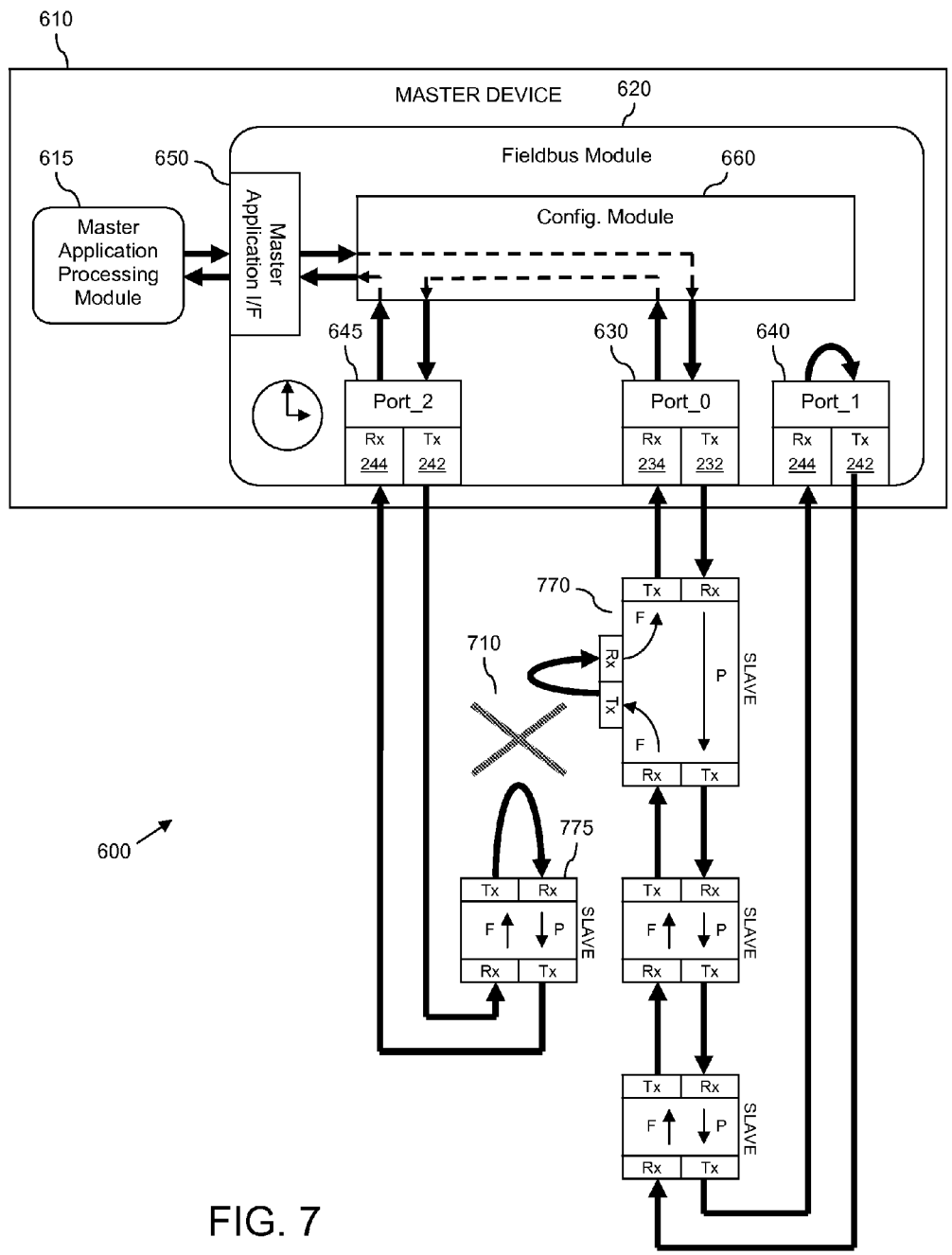
Figure 8:
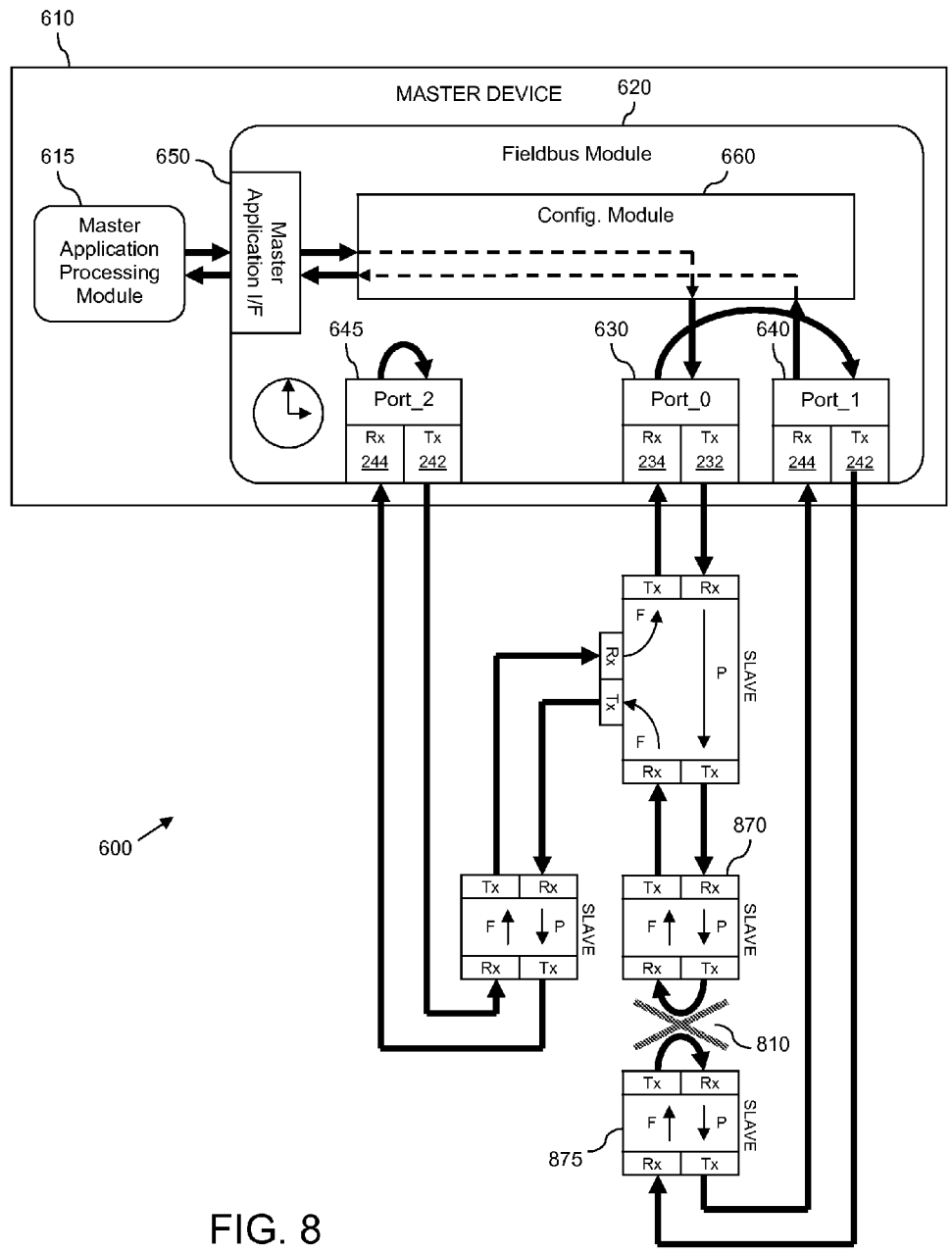

Referring now to FIGS. 6 to 8, there are illustrated simplified block diagrams of an example of a fieldbus network 600, such as an EtherCAT system. The fieldbus network 600 comprises a master device 610. The master device 610 illustrated in FIGS. 6 to 8 comprises at least one signal processing module 615 arranged to execute one or more master applications. The master device 610 further comprises at least one fieldbus module 620 arranged to provide an interface between the one or more master applications running on the processing module(s) 615 and at least one fieldbus network, such as the fieldbus network 600.

The fieldbus module 620 comprises a first communications component 630, denoted as Port_0 in the illustrated example, arranged to transmit and receive fieldbus data over a fieldbus connection. The fieldbus module 620 in the illustrated example comprises two further communications components 640, 645, denoted as Port_1 and Port_2 respectfully, arranged to transmit and receive fieldbus data over two further fieldbus connections. In this manner, the communications components 630, 640, 645 may be operably coupled to respective slave nodes within the fieldbus network 600. The fieldbus module 620 further comprises at least one master application interface component 650 arranged to provide an interface to the one or more master applications running on the signal processing module(s) 615. The fieldbus module 620 still further comprises at least one configuration component 660 arranged to perform mapping of communication channels between the communications components 630, 640, 645 and the master application interface component 650.

For example, and as illustrated in FIG. 6, the fieldbus module 620 may be configurable to operate in a first, redundant mode, wherein the configuration component 660 may be arranged to: configure the first communications component Port_0 630 to comprise an open configuration, wherein a transmit communication channel and a receive communication channel of the first communications component Port_0 630 are mapped to respective communication channels of the master application interface component 650; and configure the second and third communications components Port_1 640 and Port_2 645 to comprise a closed configuration wherein a transmit communication channel of each of the second and third communications components 640, 645 is mapped to a receive communication channel of the respective communications component 640, 645. As indicated with the arrows F and P, data flows from the first communications component 630 to the second component 640 in a manner similar to the example of FIGS. 2 to 4, as does the flow of data between the first communications component 630 and the third communications component 645.

In this manner, and by operably coupling the slave nodes to form a first circuit between the first and second communications components 630, 640 of the fieldbus module 620 and a second circuit between the first and third communications components 630, 645 as illustrated in FIG. 6, a fieldbus network 600 may be created in which the first communications component Port_0 630 of the fieldbus module 620 may form the first node in the network, and via which the master application(s) running on the signal processing module(s) 615 is/are able to transmit data frames over the fieldbus network 600. Conversely, the second and third communications component 640, 645 of the fieldbus module 620 form the last nodes in each circuit within the network. By configuring the second and third communications components 640, 645 of the fieldbus module 620 to comprise a closed configuration, the second and third communications components 640, 645 provide a 'loopback' functionality, whereby data frames are looped back around the fieldbus network, via the slave nodes to the first communications component 630.

In particular for the illustrated example, the slave nodes are orientated such that they process data frames in an 'outbound' direction; e.g. in a direction away from the first communications component 630. Accordingly, data frames returning from the second and third communications components 640, 645 are simply forwarded by the slave nodes without any processing being performed.

Furthermore, and as illustrated in FIG. 7, the fieldbus module 620 may be configurable to operate in a second, failed link mode, wherein the configuration component 660 may be arranged to, upon detection of a link failure 710 within the circuit of the fieldbus network 600 between the first communications component 630 and the third communications component 645: remap the receive communication channel of the first communications component 630 to the transmit communication channel of the third communications component 645; and remap the receive communication channel of the third communications component 645 to the respective communication channel of the master application interface component 650.

Upon such a link failure 710 within the circuit of the fieldbus network 600 between the first communications component 630 and the third communications component 645, slave nodes 770, 775 located either side of the link failure 710 close their respective ports and enable their 'loopback' functionality, wherein data frames will be looped back in the direction from which they came. Thus, reconfiguring the fieldbus module 620 to operate in this second, failed link mode in this manner enables data frames that have been looped back by the slave node 770 that are adjacent the link failure 710 in the outbound direction to be re-routed from the first communications component 630 to the third communications component 645, from where they may be sent to the remaining slave nodes 'downstream' of the link failure 710.

The master application(s) running on the signal processing module(s) 615 is/are able to transmit data frames over the fieldbus network 600 using the same communications component 630, 640, 645 irrespective of whether the fieldbus module 620 is configured to operate in the first, redundant mode or the second, failed link mode; e.g. using the first communications component 630 in the illustrated example. Furthermore, in order to provide redundancy within the fieldbus network 600, data frames are not required to be multicasted over each outgoing port resident on the master device 610. The master application signal processing module 615 is able to transmit on the first communications component 630 in the first, redundant mode or the second, failed link mode. Additionally the master device can assume a plurality of failed link modes, dependent on the locations of the failing links in the fieldbus network 600 while maintaining transmission using the same communications component 630.

Furthermore, and as illustrated in FIG. 8, the fieldbus module 620 may be configurable to operate in a third, further failed link mode, wherein the configuration component 660 may be arranged to, upon detection of a link failure 810 within the circuit of the fieldbus network 600 between the first communications component 640 and the second communications component 640: remap the receive communication channel of the first communications component 630 to the transmit communication channel of the second communications component 640; and remap the receive communication channel of the second communications component 640 to the respective communication channel of the master application interface component 650.

Upon such a link failure 810 within the circuit of the fieldbus network 600 between the first communications component 630 and the second communications component 640, slave nodes 870, 875 located either side of the link failure 810 close their respective ports and enable their 'loopback' functionality wherein data frames will be looped back in the direction from which they came. Thus, reconfiguring the fieldbus module 620 to operate in this third, further failed link mode in this manner enables data frames that have been looped back by the slave node 870 located adjacent the link failure 810 in the outbound direction to be re-routed from the first communications component 630 to the second communications component 640, from where they may be sent to the remaining slave nodes 'downstream' of the link failure 810.

The master application(s) running on the signal processing module(s) 615 is/are able to transmit data frames over the fieldbus network 600 using the same communications component 630, 640, 645 irrespective of whether the fieldbus module(s) 620 is/are configured to operate in the first, redundant mode or the third further failed link mode; e.g. using the first communications component 630 in the illustrated example. Furthermore, data frames are not required to be multicasted in order to provide redundancy within the fieldbus network 600.

In some examples, the fieldbus module(s) 620 may be configurable to operate in a still further failed link mode (not shown), wherein the configuration component 660 may be arranged to, upon detection of link failures 710, 810 within each of the circuits of the fieldbus network 600 between the first communications component 630 and the second and third communications components 640, 645 respectively: remap the receive communication channel of the first communications component 630 to the transmit communication channel of the second communications component 640; remap the receive communication channel of the second communications component 640 to the transmit communication channel of the third communications component 645; and remap the receive communication channel of the third communications component 645 to the respective communication channel of the master application interface component 650. Therefore a plurality of link failures can be handled while maintaining transmission using the same communications component 630. This allows the master device 610 to assume a ring topology irrespective of the failing links position for a plurality of network topologies and plurality of fieldbus modes.

Thus, and as illustrated in FIGS. 6 to 8, a fieldbus module adapted in accordance with some example embodiments of the present invention is not limited to supporting a fieldbus network comprising a ring topology, but may equally support scalable fieldbus networks comprising more complex topologies, such as a tree topology as illustrated in FIGS. 6 to 8. Accordingly, the fieldbus module 220 enables an improved mechanism for providing redundancy within the fieldbus network 200 as compared with the proposed prior art solution. In particular, a fieldbus module 220 is provided that enables simplified recovery and deterministic control following a link failure in a flexible and scalable manner.

Figure 9:
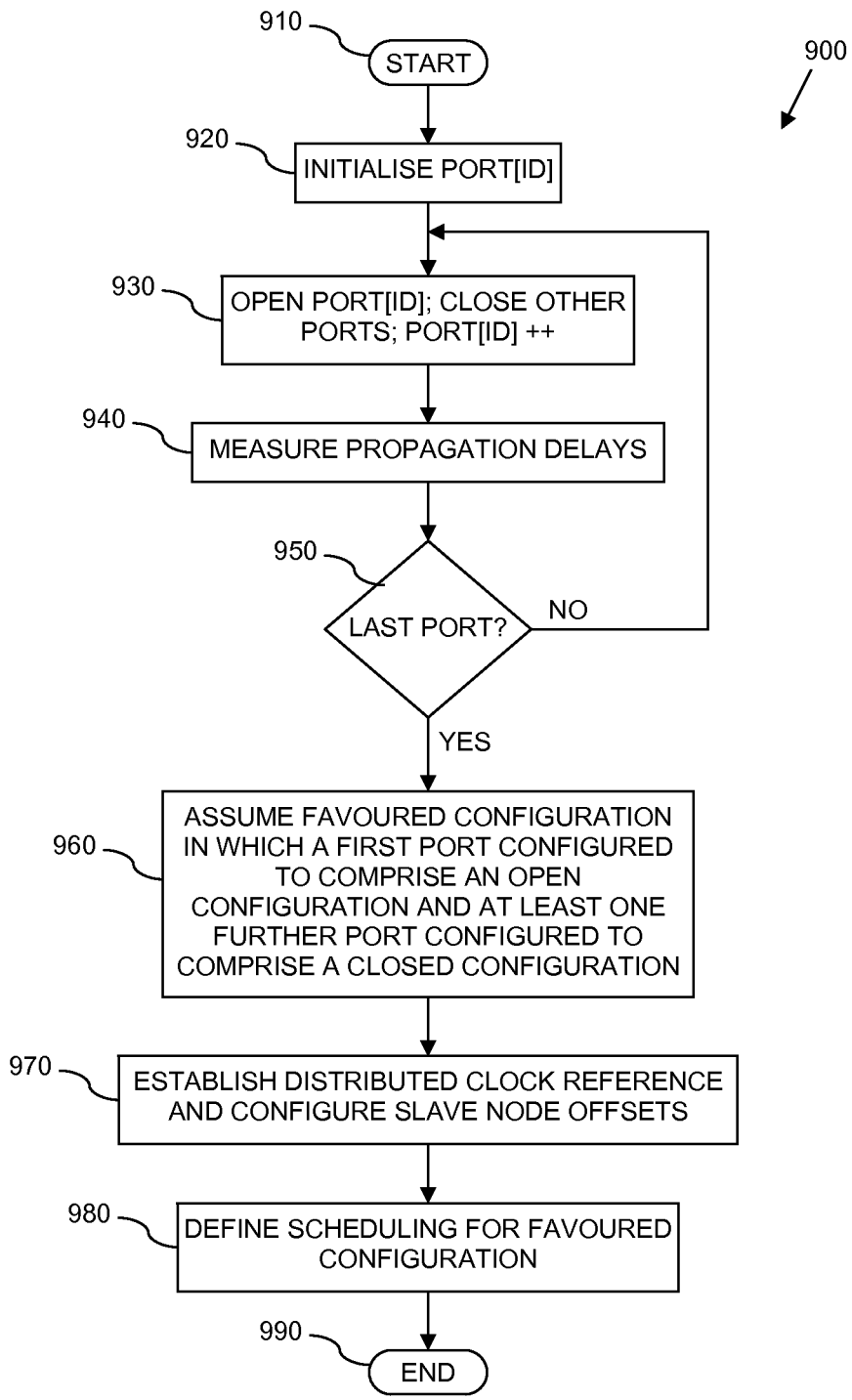

Referring now to FIG. 9 there is illustrated a simplified flowchart 900 of an example of part of a method of configuring at least part of a fieldbus network, such as may be implemented within the master devices 210, 610 of FIGS. 2 to 4 or FIGS. 6 to 8. The method starts at 910, and moves on to 920 where a communications component identifier (Port[ID]) is initialised, for example by being set to an initial '0' value. Next, at 930 a communications component within a fieldbus module, such as the fieldbus module 220 of FIGS. 2 to 4 or the fieldbus module 620 of FIGS. 6 to 8, to which the communications component identifier (Port[ID]) value corresponds, is set to an 'open' configuration. For example, a transmit communication channel and a receive communication channel of the communications component may be mapped to respective communication channels of, say, a master application interface component of the fieldbus module(s). One or more further communications components within the fieldbus component may be also set to a 'closed' configuration, for example wherein a receive communication channel of the communications component is mapped to a transmit communication channel of that communications component. In the illustrated example, the communications component identifier (Port[ID]) is also incremented at 930.

Next, at 940, propagation delays between nodes within the fieldbus network are then measured. For example, a master application may initiate a propagation delay measurement by transmitting a measurement frame, for example in the case of an EtherCAT system an ARMW (Auto increment physical Read Multiple Write) broadcast message, or equivalent, to all nodes within the fieldbus network (including the communications components integrated within the master device. Each node controller timestamps the received measurement frame, e.g. measures and writes the receive time of the measurement frame, in each direction (e.g. in the processing and forwarding directions). The master application collects the receive times once the measurement frame has travelled around the network and returned, and calculates the propagation delays between the nodes.

It is then determined whether propagation delays have been measured for all communication components set to an open configuration at 950. If propagation delays have not been measured for all communication components set to an open configuration, the method loops back to 930. Conversely, if it is determined that all propagation delay measurements have been obtained, the method moves on to 960 where a favoured network configuration is assumed, for example wherein a predetermined communications component of the fieldbus module is set to an open configuration whilst all other communications components of the fieldbus module are set to a closed configuration.

Having assumed the favoured network configuration, a distributed clock reference is established and slave node offsets are configured, at 970. For example, if the fieldbus module comprises a high resolution timing signal, the 'first' communications component of the fieldbus module set to an open configuration may be used to provide a reference time (system time), to which all other nodes within the fieldbus network are synchronised. The local time of each slave clock may then be compared to the system time held by the first communications component, and the difference compensated for individually by writing to each slave node; all slave nodes being compensated to have substantially the same absolute system time.

Next, at 980, scheduling of data frames transmitted over the fieldbus network may be defined based on the favoured configuration and on the propagation delay measurements. The method then ends, at 990.

Thus, for the part of the method illustrated in FIG. 9, the fieldbus module may be configured to operate in a first, redundant mode in which a favoured configuration is assumed. In this first, redundant mode a first communications component arranged to transmit and receive fieldbus data over at least a first fieldbus connection may be configured to comprise an open configuration wherein a transmit communication channel and a receive communication channel of the first communications component are mapped to respective communication channels of a master application interface component. Furthermore, in this first redundant mode, at least one further communications component arranged to transmit and receive fieldbus data over at least one further fieldbus connection may be configured to comprise a closed configuration wherein a transmit communication channel of the second communications component is mapped to a receive communication channel of the second communications component.

Figure 10:
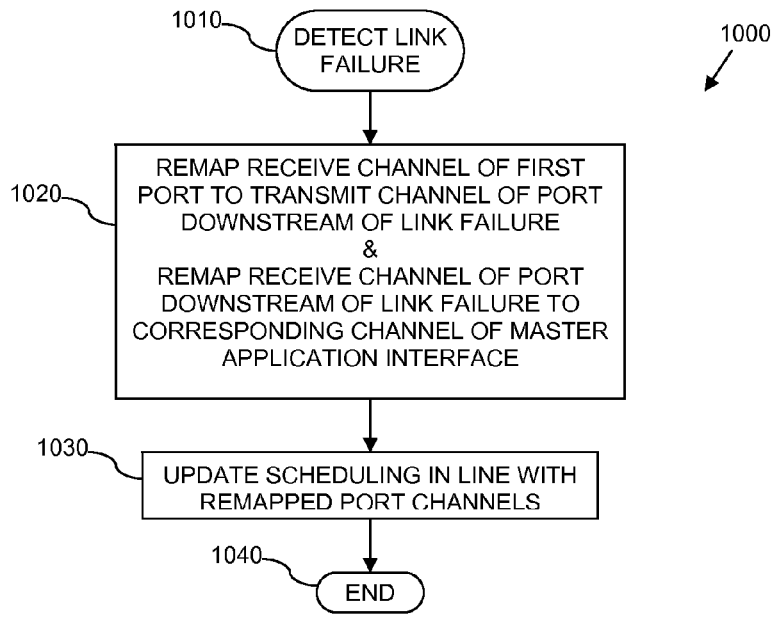
FIGS. 9 and 10 illustrate simplified flowcharts of parts of an example of a method of configuring at least part of a fieldbus network.

Referring now to FIG. 10, there is illustrated a simplified flowchart 1000 of an example of a further part of a method of configuring at least part of a fieldbus network, such as may also be implemented within the master devices 210, 610 of FIGS. 2 to 4 or 6 to 8. The method starts at 1010 with a detection of a link failure within the fieldbus network. Next, at 1020, a receive communication channel of the first communications component is remapped to the transmit communication channel of the communications component located 'downstream' of the link failure, and the receive communication channel of the communications component located downstream of the link failure is remapped to the respective communication channel of the at least one master application interface component. Scheduling of data frames transmitted over the fieldbus network is then updated in line with the remapping of the communication component channels at 1030, and the method ends at 1040.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being 'non-transitory' whereas a signal carrier in transit is to be considered 'transitory' notwithstanding that the signal may remain in transit for a lengthy period of time.

Because the illustrated embodiments of the present invention may for the most part, be implemented using electronic components and circuits known to those skilled in the art, details have not been explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader scope of the invention as set forth in the appended claims, which accordingly is not limited to the specific examples.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for simplicity and ease of understanding, the master application interface component, configuration component and communications components of the fieldbus module have been illustrated and described as separate logical components. However, it will be appreciated that these components may be implemented within a single functional component, for example by way of computer program code running on a processing unit.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the signal processing unit(s) 215, 615 for executing master applications and the fieldbus module(s) 220, 620 may be implemented within a single integrated circuit device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A real-time distributed network module arranged to provide an interface between a master application and a real-time distributed network; the real-time distributed network module comprising:
   a first communications component arranged to transmit and receive real-time distributed network data over at least a first real-time distributed network connection;
   a first further communications component arranged to transmit and receive real-time distributed network data over a further real-time distributed network connection;
   a master application interface component arranged to provide an interface to the master application; and
   a configuration component arranged to perform mapping of communication channels between the first communications component, the first further communications component and the master application interface component;
   wherein the configuration component is further arranged to determine whether propagation delays have been measured for all communication components, to set an open network configuration if the propagation delays for all of the communication components have not been measured, to set a favored network configuration if the propagation delays for all of the communication components have not been measured, to perform dynamic remapping of the communication channels between the first communications component, the first further communications component and the master application interface, upon detection of a link failure in between the first further communications component and a second further communications component within the real-time distributed network, wherein the first communications component and the first further communications component are selectively configurable to process data frames in a transmit direction and a receive direction,
   the first further communications component further arranged to loop back a first data frame to the first communications component in response to the link failure, and further arranged to set a re-circulate bit within the first data frame, wherein the dynamic remapping of the communication channels is performed in response to the configuration component detected that the re-circulate bit is set.

2. The real-time distributed network module of claim 1 configurable to operate in a first, redundant mode, wherein the configuration component is arranged to:
   configure the first communications component to comprise an open configuration wherein a transmit communication channel and a receive communication channel of the first communications component are mapped to respective communication channels of the master application interface component; and
   configure the first further communications component to comprise a closed configuration wherein a transmit communication channel of the first further communications component is mapped to a receive communication channel of the first further communications component.

3. The real-time distributed network module of claim 1 configurable to operate in a further, failed link mode, wherein the configuration component is arranged to, upon detection of a link failure within the real-time distributed network:
   remap the receive communication channel of the first communications component to the transmit communication channel of the first further communications component; and
   remap the receive communication channel of the first further communications component to the respective communication channel of the master application interface component.

4. The real-time distributed network module of claim 1 arranged to cause the configuration component to perform dynamic remapping of the communication channels from a first, redundant mode configuration to a further, failed link mode configuration, upon detection of a link failure within the real-time distributed network.

5. The real-time distributed network module of claim 1 arranged to cause the configuration component to perform dynamic remapping from a first, redundant mode configuration to a further, failed link mode configuration, upon receipt of a command received via the master application interface.

6. The real-time distributed network module of claim 1 arranged to cause the configuration component to perform dynamic remapping from a first, redundant mode configuration to a further, failed link mode configuration, upon receipt of an indication within a real-time distributed network data frame.

7. The real-time distributed network module of claim 1 wherein one of the first communications component and the first further communications component is/are selectively configurable to perform cut-through forwarding of data received at a receive communication channel thereof.

8. The real-time distributed network module of claim 1 wherein the real-time distributed network module comprises a high resolution timing source, and the first and first further communications components are capable of providing a clock reference for use within a distributed clock synchronization mechanism.

9. The real-time distributed network module of claim 1 wherein the real-time distributed network module is arranged to provide an interface between the master application and an EtherCAT network, and the first and first further communications components are arranged to transmit and receive Ethernet data frames over the respective real-time distributed network connections.

10. The real-time distributed network module of claim 9 wherein the first and first further communications components are arranged to support at least a subset of EtherCAT processing functionality.

11. The real-time distributed network module of claim 9 wherein the first and first further communications components are arranged to support local proprietary commands contained within metadata and/or descriptors supplied by a master application.

12. A real-time distributed network module as claimed in claim 1, implemented as an integrated circuit.

13. A real-time distributed network comprising a real-time distributed network module according to claim 12.

14. A method of configuring at least part of a real-time distributed network; the method comprising, at a real-time distributed network module arranged to provide an interface between a master application and a real-time distributed network:
- determining whether propagation delays have been measured for all communication components;
- if the propagation delays for all of the communication components have not been measured, setting an open network configuration;
- if the propagation delays for all of the communication components have not been measured, setting a favored network configuration;
- in response to the favored network configuration, configuring a first communications component to comprise an open configuration wherein a transmit communication channel and a receive communication channel of the first communications component are mapped to respective communication channels of the master application interface component, and selectively configuring the first communications component to process data frames in a transmit direction and a receive direction;
- in response to the favored network configuration, configuring a first further communications component to comprise a closed configuration wherein a transmit communication channel of the first further communications component is mapped to a receive communication channel of the first further communications component;
- looping back, by the first further communications component, a first data frame to the first communications component in response to a link failure; and
- setting a re-circulate bit within the first data frame to indicate the link failure,
- wherein the method further comprises, upon detection of the re-circulate bit being set and detection of the link failure within the real-time distributed network:
  - remapping the receive communication channel of the first communications component to the transmit communication channel of the first further communications component, and selectively configuring the first communications component to process data frames in the transmit direction; and
  - remapping the receive communication channel of the first further communications component to the respective communication channel of the master application interface component, and selectively configuring the second communications component to process data frames in the receive direction.

15. The method of claim 14 wherein the real-time distributed network module comprises a high resolution timing source, and wherein method further comprises:
- providing, by the first and first further communications components, a clock reference for use within a distributed clock synchronization mechanism.

16. The method of claim 14 further comprising:
- providing an interface between the master application and an EtherCAT network; and
- transmitting and receiving, by the first and first further communications components, Ethernet data frames over the respective real-time distributed network connections.

17. A non-transitory computer program product having executable program code stored therein for programming signal processing logic to perform a method configuring at least part of a real-time distributed network, the code operable for, at a real-time distributed network module arranged to provide an interface between a master application and a real-time distributed network:
- determining whether propagation delays have been measured for all communication components;
- if the propagation delays for all of the communication components have not been measured, setting an open network configuration;
- if the propagation delays for all of the communication components have not been measured, setting a favored network configuration;
- in response to the favored network configuration, configuring a first communications component to comprise an open configuration wherein a transmit communication channel and a receive communication channel of the first communications component are mapped to respective communication channels of the master application interface component, and selectively configuring the first communications component to process data frames in a transmit direction and a receive direction;
- in response to the favored network configuration, configuring first further communications component to comprise a closed configuration wherein a transmit communication channel of the first further communications component is mapped to a receive communication channel of the first further communications component;
- looping back, by the first further communications component, a first data frame to the first communications component in response to a link failure; and
- setting a re-circulate bit within the first data frame to indicate the link failure,
- wherein the code is further operable for, upon detection of the re-circulate bit being set and detection of the link failure within the real-time distributed network:
  - remapping the receive communication channel of the first communications component to the transmit communication channel of the first further communications component, and selectively configuring the first communications component to process data frames in the transmit direction; and
  - remapping the receive communication channel of the first further communications component to the respective communication channel of the master application interface component, and selectively configuring the second communications component to process data frames in the receive direction.

18. The non-transitory computer program product of claim 17 wherein the computer readable storage medium comprises at least one of: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

19. The non-transitory computer program product of claim 17 wherein the real-time distributed network module comprises a high resolution timing source, and wherein the code is further operable for:
- providing, by the first and first further communications components, a clock reference for use within a distributed clock synchronization mechanism.

20. The non-transitory computer program product of claim 17 wherein the code is further operable for:

providing an interface between the master application and an EtherCAT network; and transmitting and receiving, by the first and first further communications components, Ethernet data frames over the respective real-time distributed network connections.

\* \* \* \* \*